United States Patent [19]
Nilsson et al.

[11] Patent Number: 5,785,431
[45] Date of Patent: Jul. 28, 1998

[54] METHOD AND ARRANGEMENT FOR TEMPERATURE-INDEPENDENT MOUNTING IN A BEARING

[75] Inventors: Anders Nilsson, Karlskoga; Stefan Olsson, Monsteras, both of Sweden

[73] Assignee: Bofors AB, Karlskoga, Sweden

[21] Appl. No.: 556,939

[22] PCT Filed: May 30, 1994

[86] PCT No.: PCT/SE94/00515

§ 371 Date: Apr. 9, 1996

§ 102(e) Date: Apr. 9, 1996

[87] PCT Pub. No.: WO94/29608

PCT Pub. Date: Dec. 22, 1994

[30] Foreign Application Priority Data

Jun. 4, 1993 [SE] Sweden ................. 9301910

[51] Int. Cl.$^6$ ........................... F16C 17/22
[52] U.S. Cl. ........................... 384/493; 384/905
[58] Field of Search .................. 384/278, 493, 384/557, 905

[56] References Cited

U.S. PATENT DOCUMENTS 2,324,676  7/1943  Butterfield ............... 384/557 X
2,590,761  3/1952  Edgar ..................... 384/278
4,218,273  8/1980  Feist et al. ............... 384/905 X
4,283,096  8/1981  Picard et al. ............. 384/557
5,028,152  7/1991  Hill et al. ................ 384/557
5,073,039  12/1991 Shervington ............. 384/493 X
5,249,869  10/1993 Mabe ..................... 384/278

FOREIGN PATENT DOCUMENTS 2000601  1/1971  Germany .
2427688  3/1984  Germany .
1244913  9/1971  United Kingdom .

*Primary Examiner*—Thomas R. Hannon
*Attorney, Agent, or Firm*—Pollock, Vande Sande & Priddy

[57] ABSTRACT

A method and apparatus for obtaining temperature-independent mounting of a shaft made of a first material having a first coefficient of thermal expansion, in a bearing which interacts with the shaft and which is made of a second material having a second coefficient of thermal expansion, the first coefficient of thermal expansion having a higher value than the second coefficient of thermal expansion, includes arranging on the shaft made of the first material having the first, higher, coefficient of thermal expansion, an outer shell to surround at least the greater part of the shaft's circumferential surface and to be at least partly located outside the area in which the bearing is supported. The outer shell is made of a third material having a third coefficient of thermal expansion which has a lower value than the second coefficient of thermal expansion.

8 Claims, 1 Drawing Sheet

METHOD AND ARRANGEMENT FOR TEMPERATURE-INDEPENDENT MOUNTING IN A BEARING

FIELD OF THE INVENTION

The present invention relates to a method for obtaining temperature-independent mounting of a shaft made of a first material having a first coefficient of thermal expansion in a bearing which interacts with the shaft and which is made of a second material having a second coefficient of thermal expansion. The invention also relates to a bearing arrangement comprising a shaft made of a first material having a first coefficient of thermal expansion and a bearing which interacts with the shaft and which is made of a second material having a second coefficient of thermal expansion. In the present method and the bearing arrangement, the first coefficient of thermal expansion is of a higher value than the second coefficient of thermal expansion.

BACKGROUND OF THE INVENTION

Bearing arrangements exist where, for example, there is a requirement for the construction to have a low weight. Shafts forming part of such a bearing arrangement can in this case be made of light metal, such as aluminium or magnesium, while the bearings are made of steel. As long as these bearing arrangements are used within limited temperature ranges, they can be given the desired properties regarding of freedom from play and low friction.

However, if the bearing arrangements are to be used within very wide temperature ranges, for example between −30° to +60°, then problems arise due the considerable differences in the coefficients of thermal expansion of the material of the shafts and bearings. The bearing combination which at room temperature functions entirely in accordance with the requirements set down will, within the upper temperature range, generally be subject to excessively high friction, with the shaft being clamped harder, while the same bearing combination will, within the lower temperature range, have too much play because the shaft has shrunk more than the bearing. In high-precision servo systems, for example, freedom from play and low friction are required in all the bearings occurring therein. Bearing arrangements in accordance with the above which have been exposed to considerable temperature variations do not satisfy the set requirements within the whole temperature range.

SUMMARY OF THE INVENTION

The object of the present invention is to obtain a bearing arrangement of low weight which satisfies the set requirements regarding freedom from play and low friction within a wide temperature range.

The object of the invention is achieved by a method for obtaining temperature-independent mounting in a bearing, which is characterized by arranging, on the shaft made of the first material having the first, higher, coefficient of thermal expansion, an outer shell which surrounds at least the greater part of the circum-ferential surface and is made of a third material having a third coefficient of thermal expansion which is of a lower value than the second coefficient of thermal expansion of the bearing. A bearing arrangement of the present invention characterized in that the shaft made of the first material having the first, higher, coefficient of thermal expansion is provided with an outer shell which surrounds at least the greater part of the circumferential surface and is made of a third material having a third coefficient of thermal expansion which is of a lower value than the second coefficient of thermal expansion of the bearing. By combining two materials, where one material has a higher and the other material a lower coefficient of thermal expansion than the bearing material, lights weight shafts can thus be obtained which have essentially the same thermal expansion as the bearing material. The material which has the greatest material movements is reinforced with an outer layer limiting these to the desired value. The bearing arrangement can therefore be used within a very wide temperature range.

In this connection it is worth noting that it is already known to compensate for different coefficients of thermal expansion in two interacting elements by introducing a third, intermediate, element having another coefficient of thermal expansion. From the U.S. Pat. No. 5,028,152, for example, it is known to compensate, in the axial direction, for the lower thermal expansion of a steel shaft relative to a light metal casing by introducing an element with high thermal expansion acting in the axial direction between shaft and casing. The patent specification DE 2,427,688 discloses another example in which there has been inserted, between a light metal casing and the outer ferrite ring of a bearing, an element having a coefficient of thermal expansion which is approximately midway between the coefficients of thermal expansion of the casing and the outer ring of the bearing. However, neither of the two documents cited above concerns the mounting of light metal shafts in a bearing and the special mounting problems which arise from the interaction between light metal shafts having relatively high coefficients of thermal expansion and bearings, preferably made of steel, having relatively low coefficients of thermal expansion.

A suitable material for the shafts is aluminium or magnesium with an outer shell of carbon fiber. The bearings are preferably made of steel. The carbon fiber, which determines the thermal expansion of the outer shell, has a coefficient of thermal expansion of approximately 0 E-6K$^{-1}$. For aluminium, the same coefficient is approximately 24 E-6K$^{-1}$, while the coefficient of thermal expansion of the bearing material can be set at approximately 12 E-6K$^{-1}$. By choosing aluminium and carbon fiber as material for the input shafts and steel as the bearing material, it is possible to obtain bearing arrangements having essentially the same thermal expansion in the light metal shaft, wound with carbon fiber, as in the bearing.

According to an advantageous embodiment of the bearing arrangement, the outer shell made of a third material, carbon fiber, is applied by being wound essentially tangentially at 90° relative to the longitudinal direction of the shaft. Winding the carbon fiber in this way provides for a favorable interaction between the aluminium and the carbon fiber, and, when so required, the carbon fiber manages to resist the movements of the aluminium.

According to another advantageous embodiment, the bearing arrangement is characterized in that the second material of the shaft is designed with a raised part for direct engagement with a bearing arranged in line with the raised part. Such an embodiment facilitates the mounting of the bearing, since the bearing can be placed directly on the raised part without any further working of the shaft.

According to a further advantageous embodiment, a steel ring is arranged round the outer shell of the shaft of the bearing arrangement for engagement with a bearing arranged in line with the ring. As in the embodiment mentioned in the preceding paragraph, the provision of a steel ring facilitates the mounting of the bearing.

BRIEF DESCRIPTION OF THE DRAWINGS

The invention will be described in greater detail hereinbelow on the basis of two exemplary embodiments and with reference to the attached drawings, in which.

DETAILED DESCRIPTION OF THE PREFERRED EMBODIMENT(S)

Figure 1:
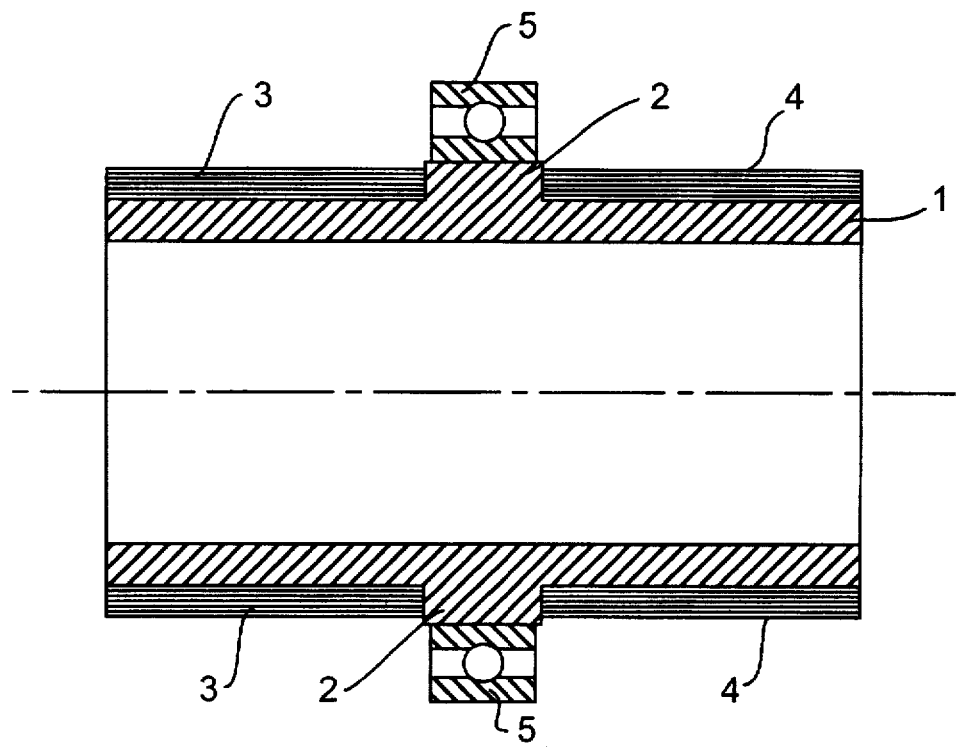
FIG. 1 shows a first exemplary embodiment of a bearing arrangement according to the present invention.
Figure 2:
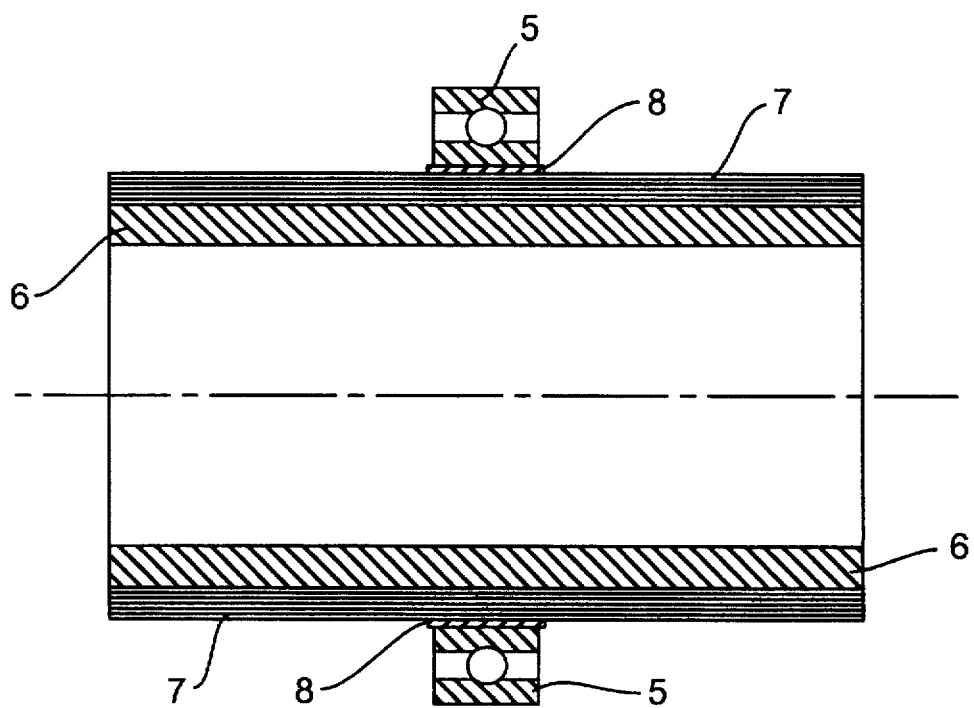
FIG. 2 shows a second exemplary embodiment of a bearing arrangement according to the invention.

The first embodiment according to FIG. 1, hereinafter referred to as type A, comprises an inner aluminium core 1, which can be tubular and is provided with a central annular raised part or bulge 2 which expediently exhibits the maximum external diameter of the complete shaft and which is surrounded on both sides by an outer shell made of a carbon fiber reinforced epoxy coating 3 and 4. The purpose of the carbon fiber reinforcement is to prevent thermal movements of the core 1 of the shaft up to certain limits, i.e. equal to the temperature movements of the bearing. The central bulge 2 allows a bearing 5, which is a ball bearing in the embodiment shown, to be applied directly against the metal of the core. The quantity of carbon fiber reinforced epoxy which is applied to the aluminium core is adapted to resist the shear stresses, which are built into the boundary layers between the various parts of the aluminium core and the carbon fiber reinforced outer shell, and which can occur within the temperature range for which the bearing arrangement has been designed. The carbon fiber reinforced epoxy coating is preferably wound tangentially at 90° relative to the longitudinal axis of the shaft.

According to the second embodiment, hereinafter referred to as type B, the whole aluminium core 6 is surrounded by a carbon fiber reinforced epoxy shell or outer shell 7. Compared with type A, the stresses are slightly smaller, and the outer layer can therefore be made slightly thinner. In order to obtain an area on which to apply a bearing 5, according to the exemplary embodiment shown, a bearing point has been provided in the form of a glued-on steel ring 8. Before the steel ring is applied, the carbon fiber reinforced epoxy shell is worked to a diameter suitable for the steel ring, and, when the steel ring has been applied, a reworking of the latter is carried out. Alternatively, the carbon fiber reinforced outer shell 7 can be ground in and the steel ring 8 spared.

A suitable shaft diameter range for the bearing arrangement can be 0.1–0.5 m. However, this does not rule out the possibility of the invention being applied to shaft with diameters beyond this range.

Carbon fiber reinforced epoxy hardens at 100°–120° C. At this temperature the bearing arrangement has no built-in stresses. In order to avoid considerable stresses being built into the bearing arrangement at low temperatures, the carbon fiber can be applied in passes. Each winding pass is followed by hardening and cooling before the next winding pass is applied.

The invention is not limited to the exemplary embodiments discussed above, and instead a great many embodiments are allowed for within the scope of the invention. For example, a thermoplastic can be used instead of epoxy.

We claim:

1. A method for obtaining temperature-independent mounting of a shaft made of a first material, having a first coefficient of thermal expansion, in a bearing which interacts with the shaft and which is made of a second material having a second coefficient of thermal expansion, said first coefficient of thermal expansion having a higher value than the second coefficient of thermal expansion, said method comprising the steps of:

arranging on the shaft made of the first material having the first, higher coefficient of thermal expansion, an outer shell, the outer shell being made of a third material having a third coefficient of thermal expansion which has a lower value than the second coefficient of thermal expansion;

surrounding at least the greater part of circumferential surface of said shaft with said outer shell; and at least partly locating said outer shell outside the area in which the bearing is supported.

2. A method according to claim 1 further including applying the outer shell on the shaft, by winding essentially tangentially at 90° relative to the longitudinal direction of the shaft.

3. A method according to claim 1 wherein said first material is light metal and said second material is steel.

4. A bearing arrangement comprising:

a shaft made of a first light material, having a first coefficient of thermal expansion;

a bearing which interacts with the shaft and is made of a second material, having a second coefficient of thermal expansion, the first coefficient of thermal expansion having a higher value than the second coefficient of thermal expansion; and an outer shell provided on the shaft to surround at least the greater part of the circumferential surface of the shaft and to be at least partly located outside the area at which the bearing is supported, said outer shell being made of a third material having a third coefficient of thermal expansion which has a lower value than the second coefficient of thermal expansion.

5. A bearing arrangement according to claim 4, wherein the third material is carbon fiber reinforced epoxy.

6. A bearing according to claim 5, wherein the carbon fiber is wound essentially tangentially at 90° relative to the longitudinal direction of the shaft.

7. A bearing arrangement according to claim 4 wherein the shaft is designed with a raised part made of said first material for direct engagement with a bearing arranged on the raised part and aligned therewith.

8. A bearing arrangement according to claim 4, further comprising a steel ring arranged on the outer shell of the shaft for engagement with a bearing located aligned on the steel ring.

* * * * *